May 22, 1962 W. FEDUSKA ETAL 3,036,139

BRAZING ALLOY AND BRAZING OF THERMOELECTRIC ELEMENTS THEREWITH

Filed April 19, 1960

WITNESSES

Raymond H. Majesko

Edwin E. Bassler

INVENTORS
William Feduska &
Robert E. Gainer, Jr.
BY
Frederick Shapoe
ATTORNEY 3,036,139
Patented May 22, 1962

3,036,139

BRAZING ALLOY AND BRAZING OF THERMOELECTRIC ELEMENTS THEREWITH

William Feduska, Emsworth, and Robert E. Gainer, Jr., Monroeville, Pa., assignors to Westinghouse Electric Corporation, East Pittsburgh, Pa., a corporation of Pennsylvania Filed Apr. 19, 1960, Ser. No. 23,211
3 Claims. (Cl. 136—4)

The present invention relates to a brazing alloy for joining thermoelectric elements to metal conductors and a process for doing the same.

Heretofore there has been difficulty in providing a suitable solder for the brazing of thermoelectric elements to metal conductors whereby the solder adequately wets the surfaces thereof to be joined thereby providing a sound continuous joint therebetween.

An object of the present invention is to provide a brazing alloy comprising predetermined proportions of gold, silicon, nickel, zinc and antimony particularly adapted for joining a body of thermoelectric material consisting essentially of zinc antimonide to an electrically conducting metal member.

Another object of the invention is to provide a process for joining thermoelectric bodies to metal conductors which comprises applying to the surfaces thereof to be joined a solder composed of predetermined proportions of gold, silicon, nickel, zinc and antimony.

A further object of the present invention is to provide a process for joining a body of thermoelectric material consisting essentially of zinc antimonide to a metallic electrically conducting member by heating the metallic member with an alloy solder comprising predetermined proportions of gold, silicon, nickel, zinc and antimony placed on at least part of one side of the member to critical temperatures and in an inert atmosphere to melt the solder, rotating the thermoelectric body on the part of the member containing the molten solder in one direction until a fillet is formed between the body and the member and cooling the assembly so that a low resistance, sound, continuous solder joint is formed between the thermoelectric body and the heat conducting member.

A still further object of the invention is to provide an improved thermoelectric device capable of use at temperatures of up to about 500° C. comprising a body of a thermoelectric material comprising essentially zinc antimonide and metal conductors attached to the body of thermoelectric material by a solder comprising predetermined proportions of gold, silicon, nickel, zinc and antimony.

Other objects of the invention will, in part, be obvious and will, in part, appear hereinafter.

Figure 1:
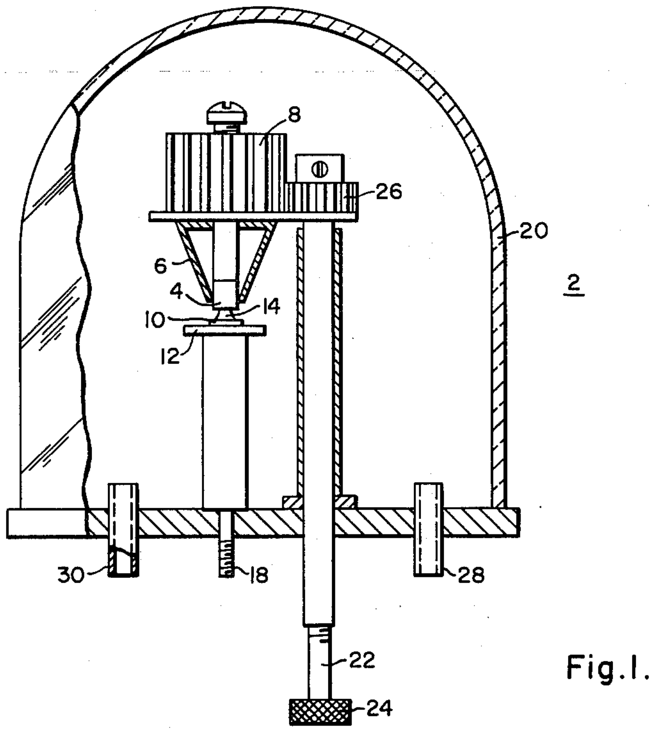
Figure 2:
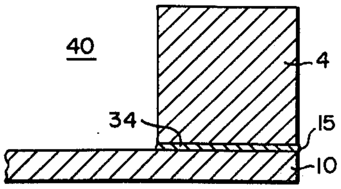

For a better understanding of the nature and objects of this invention, reference should be had to the following detailed description and drawings, in which:

FIGURE 1 is a view in elevation partly in cross section of apparatus for soldering a member in accordance with the invention; and FIGURE 2 is a plan view in cross section of a portion of a joined thermoelectric device assembly.

In accordance with the present invention, and in attainment of the foregoing objects, there is provided a novel solder and a process for forming a thermoelectric device from a shaped body of thermoelectric material and particularly comprising essentially zinc antimonide, and an electrically conducting metallic member applied to one surface thereof, the process comprising heating the metallic strap with an alloy solder composed of predetermined proportions of gold, silicon, nickel, zinc and antimony placed on the strap to the melting point of the solder which normally will be at a temperature of from about 550° C. to 600° C., in an inert atmosphere. The solder may be treated ultrasonically or mechanically agitated in situ to secure good wetting of both the thermoelectric material and the metal conductor. For particularly good results, the body of thermoelectric material is placed on a segment of the metal member containing a quantity of the molten solder and rotated in one direction for a few seconds until a fillet indicating good wetting of the solder is formed between the body and the member. The assembly is then cooled, whereby a low resistance, sound, continuous joint is formed between the thermoelectric body and the electrically conducting member.

The alloy solder comprises, by weight, from 43% to 48% gold, from 1.5% to 4% silicon, from 0.5% to 2.5% nickel, from 16.5% to 20% zinc and from 25.5% to 38.5% antimony. More specifically a specific alloy solder composition comprises, by weight, 46% gold, 3% silicon, 1% nickel, 17.5% zinc and 32.5% antimony. Small amounts of the metals, copper, tin, cadmium, chromium, iron, germanium, tellurium, bismuth and aluminum or the like may be present in the alloy in a quantity not to exceed a total of 0.5% of any one metal or combination thereof without being deleterious to the alloy properties. The brazing alloy may be prepared by any method known to those skilled in the art to assure a homogeneous mixture of the elements of the alloy system. Thus a mixture of the powders of the alloy components can be placed in a crucible and induction melted. The resultant ingot, bar, rod or the like prepared by pouring the melt into the mold may be sectioned to provide the desired quantity of the alloy for any given thermoelectric body cross section. By varying the composition, the melting point of the brazing alloy may be varied from about 500° C. to 600° C.

Referring to FIG. 1, there is shown an apparatus 2 for making metallurgical bonds of thermoelectric pellets in a controlled atmosphere, which is illustrative of one type of apparatus that may be used to carry out effectively the soldering process of the present invention. In a conventional joining technique of bonding a thermoelectric body to a metal conductor in which the brazing alloy is preplaced on the surfaces to be joined, the joint is heated and the parts are forced together, most of the oxide, gas, and dirt initially present or formed during heating remain in the joint thereby preventing optimum wetting by the brazing alloy. By rotating one of the joint elements relative to the other while the brazing alloy is molten, much of this oxide, gas and dirt can be forced out of the joint leaving clean surfaces for the liquid brazing alloy to wet.

A shaped body 4 of thermoelectric material is prepared by any suitable means, such as, by powder metallurgy techniques or casting, and is placed in a spring chuck 6 attached to a gear 8. A metallic conductor strap 10, to which the pellet 4 is to be joined, is placed on a heating element 12, such as graphite, and is clamped in place. A pellet of the brazing alloy is placed on the strap to cover an area substantially equivalent to the cross sectional area of the thermoelectric body. The electrically conducting strap may be composed of copper, nickel, nickel base alloys, stainless steels, or any ferrous base alloys that are free from substantial quantities of titanium and aluminum and whose coefficient of thermal expansion closely approaches that of zinc antimonide.

The heater element 12 is heated by an electrical current conducted through the power leads 18, thus heating the strap and the preplaced brazing alloy. When the brazing alloy becomes molten, the shaped body 4 is lowered onto the strap and rotated in one direction until a fillet of molten solder is completely formed around the circumference of the body 4. The lowering and rotational motions of body 4 are generated outside of bell jar housing 20 by manual operation of the shaft 22 through the manipulator knob 24. The shaft 24 can be raised or lowered as well as turned by manipulation of knob 24. By rotating the manipulator in a counterclockwise direction, a gear 26 affixed to the end thereof is rotated in a counterclockwise direction and meshes with gear 8 to cause it to rotate in a clockwise direction and thus rotating the thermoelectric body 4 in a clockwise direction. Rotation only in one direction is desirable to carry any oxide, gas and dirt entrapped between the thermoelectric body and the electrically conducting strap to the exterior of the thermoelectric body.

Since the presence of oxidizing and reactive gases is deleterious to the bond strength, it is necessary that the bonding operation takes place in a highly purified inert atmosphere, such as argon or helium or mixtures thereof. The gas may be circulated through the bell jar housing by means of an inlet valve 28 and an outlet valve 30. Argon or helium of a purity of 99.99% have been quite effective.

Upon cooling the assembly and removing the same from the rotary device of FIG. 1, a thermoelectric device component 40, as shown in FIG. 2, is thereby produced comprising the thermoelectric body 4 joined to the electrically conducting metallic strap 10 by means of layer 34 of the brazing alloy. The solder fillet 15 is present about the periphery of the body 4. The solder layer 34 provides a sound, continuous joint of low electrical resistivity and relatively high resistance to oxidation.

Zinc antimonide thermoelectric elements prepared as disclosed herein may be employed in applications that require operating temperatures of up to 450° C. or even higher, there being no decrease in thermoelectric efficiency when operating at these high temperatures due to the brazed alloy joint of this invention being applied thereto.

The following example illustrates the teachings of the invention.

A zinc antimonide body with a diameter of one-half inch and a length of one-half inch was joined to a gold plated nickel strap of approximately 60 mils in thickness by applying a pellet of solder composed of 46% gold, 3% silicon, 1% nickel, 17.5% zinc and 32.5% antimony, and using the rotating soldering apparatus of FIG. 1 heretofore described. A high purity argon atmosphere was circulated within the bell jar housing, the argon having a dew point of −50° C. The nickel strap was gold plated to assist in wetting the nickel strap. The strap was resistance heated to a temperature of 590° C. for approximately 5 minutes to melt the solder alloy. The thermoelectric body was then lowered onto the strap and rotated for approximately 5 seconds at a rotational velocity of 3 revolutions per second. Rotation was terminated and the temperature was then rapidly reduced to room temperature while the thermoelectric assembly was retained in place.

The resulting bond was examined and found to be excellent. The room temperature electrical resistance of the joint was approximately 0.002 ohm. The joint was tested and exhibited relatively high resistance to oxidation. The thermoelectric device was thermally cycled many times from room temperature to 450° C. with highly satisfactory results and no observable deterioration of the joint.

Other thermoelectric compositions may be soldered to by the solder alloys of the present invention. The solders wet and bond excellently to nickel, copper, stainless steels, gold and other metals.

It is to be understood that the above description should be interpreted as being illustrative and not limiting.

We claim as our invention:

1. A brazing alloy comprising by weight from 43% to 48% gold, from 1.5% to 4% silicon, from 0.5% to 2.5% nickel, from 16.5% to 20% zinc, and from 25.5% to 38.5% antimony and small amounts of incidental impurities.

2. A brazing alloy comprising by weight about 46% gold, 3% silicon, 1% nickel, 17.5% zinc and 32.5% antimony and small amounts of incidental impurities.

3. In a thermoelectric device, a body of thermoelectric material consisting essentially of zinc antimonide, a metal member disposed adjacent to a surface of the body, and a thin layer of solder joining the body to the member, the solder comprising essentially by weight 43% to 48% gold, from 1.5% to 4% silicon, from 0.5% to 2.5% nickel, from 16.5% to 20% zinc and from 25.5% to 38.5% antimony and providing a sound, low resistance, continuous joint between the body and the member.

References Cited in the file of this patent

UNITED STATES PATENTS

| | | |
|---|---|---|
| 2,712,175 | Stark | July 5, 1955 |
| 2,758,146 | Lindenblad | Aug. 7, 1956 |
| 2,818,332 | Pettibone | Dec. 31, 1957 |
| 2,877,283 | Justi | Mar. 10, 1959 |
| 2,932,887 | McCuaig et al. | Apr. 19, 1960 |
| 2,950,189 | Ames | Aug. 23, 1960 |

OTHER REFERENCES

Fox: RCA Technical Note No. 366, June 1960 (1 page).

ASTIA, AD 241,247, August 10, 1959, page 35.